R. G. SHELLER.
GAMBREL.
APPLICATION FILED MAR. 9, 1910.
966,777.
Patented Aug. 9, 1910.
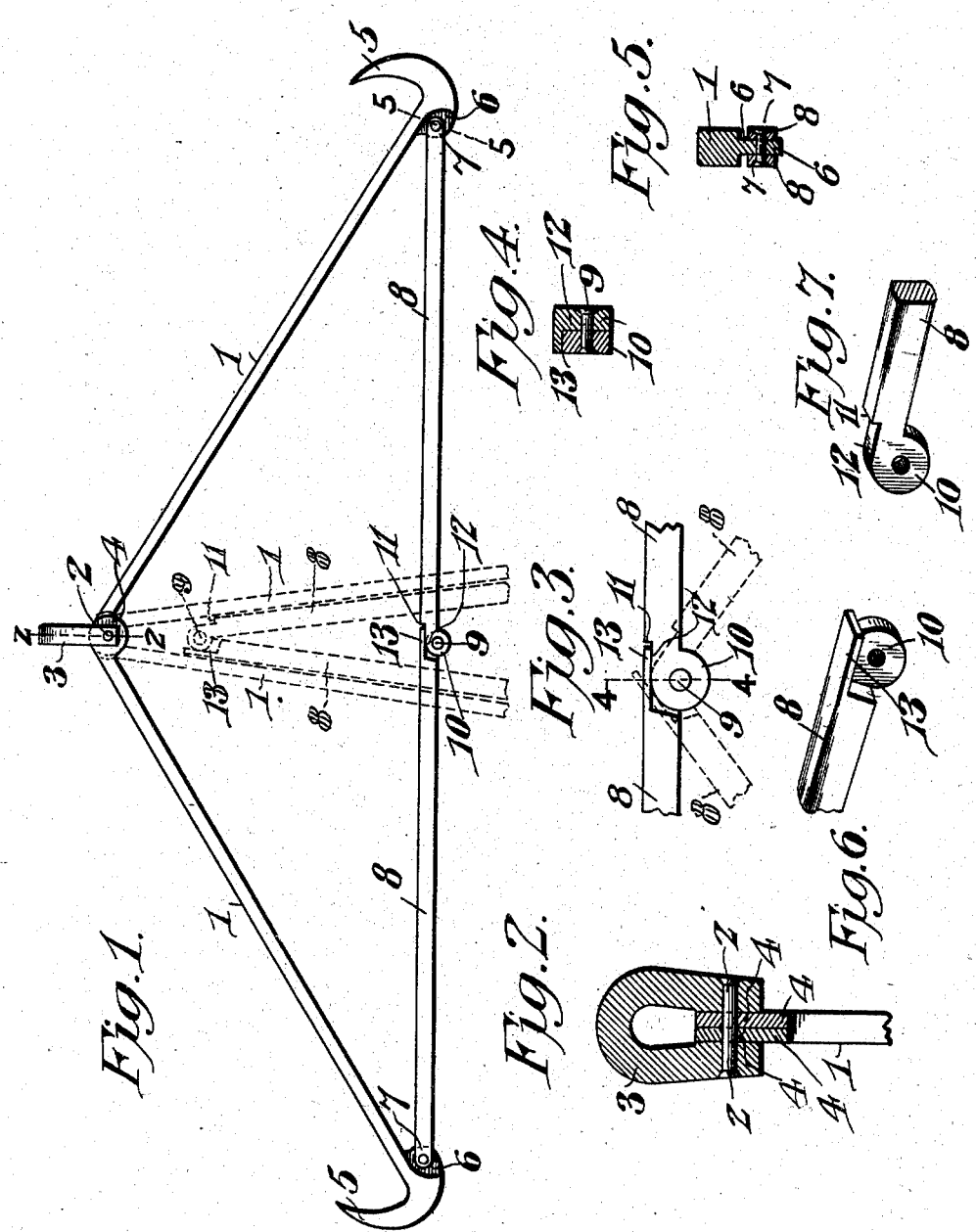

UNITED STATES PATENT OFFICE.

RAYMOND G. SHELLER, OF GRUNDY CENTER, IOWA.

GAMBREL.

966,777.  Specification of Letters Patent.  Patented Aug. 9, 1910.

Application filed March 9, 1910. Serial No. 548,241.

*To all whom it may concern:*

Be it known that I, RAYMOND G. SHELLER, a citizen of the United States, residing at Grundy Center, in the county of Grundy and State of Iowa, have invented a new and useful Gambrel, of which the following is a specification.

This invention relates to improvements in gambrels for supporting carcasses while the same are being dressed or cut up, and the invention consists in certain novel features which are illustrated in the accompanying drawings and will be hereinafter described and claimed.

In the drawings, Figure 1 is an elevation of my improved gambrel showing the same expanded in full lines and folded in dotted lines. Fig. 2 is a detail sectional view taken on the line 2—2 of Fig. 1. Fig. 3 is a detail elevation of the joint between the brace bars. Fig. 4 is a section on the line 4—4 of Fig. 3. Fig. 5 is a detail section on the line 5—5 of Fig. 1. Figs. 6 and 7 are detail perspective views of the members of the joint between the brace bars.

My improved gambrel comprises the hook arms 1, 1 which are pivoted together at their upper ends by means of a pin 2 upon which is secured a ring or hook 3, whereby the device may be attached to a block and tackle or other support. The hook arms 1 are reduced on their opposite sides at their upper ends and formed into perforated ears 4, the perforations of which are adapted to register so as to receive the pivot pin and thereby secure the arms together and between the branches of the hook or ring 3. The lower ends of the arms 1 are each provided with upstanding pointed hooks 5 adapted to take into the legs of the carcass, and on the under side of each hook is a lug or projection 6 to which I pivotally secure the forked end 7 of a brace arm 8. A brace arm 8 is pivotally attached in this manner to each of the hook arms and the said brace arms extend inward and meet on the central line of the device and are pivotally connected by a pin 9 inserted through perforated lugs or ears 10 formed at the said meeting ends of the brace arms. One of the arms is provided on its upper or inner side with a transverse shoulder 11 arranged at the end of a recess or reduced portion 12 directly over the perforated lug 9, while the meeting member is provided with a longitudinally-extending lip or locking plate 13 projecting over the lug 9 on the said arm and adapted to fit within the recess 12 and against the shoulder 11 so as to prevent the said brace arms swinging downward so far as to cause a collapse of the device.

The use and advantages of the device will, it is thought, be readily understood and appreciated. When a carcass is to be supported by the device, the hind legs are engaged over the hooks 5 and the device is then spread into the position shown in full lines in Fig. 1. It will be noticed that in this position, the brace arms are disposed in a straight line below the upper surfaces of the hooks 5 so that the said brace arms will effectually resist the tendency of the hook arms to swing together, due to the weight of the carcass suspended thereon. The device is thus effectually prevented from collapsing under the weight of the carcass and the carcass may be handled freely without any liability of the same dropping from the gambrel. When the device is not in use, it may be folded into the position shown in dotted lines in Fig. 1, so that it will occupy very little space and will not be apt to be injured by chance blows or to catch into the clothing of persons passing the same so as to cause injury thereto. It will be noted that the several joints are so constructed as to avoid projecting surfaces and crevices in which meat might lodge so as to interfere with the successful operation of the gambrel or to create unsanitary conditions.

Having thus described the invention, what I claim as new, and desire to secure by Letters Patent, is:—

1. A gambrel comprising a pair of hook arms pivoted together at their upper ends, and a pair of brace arms pivoted together at their inner ends and pivotally attached at their outer ends to the lower ends of the hook arms.

2. A gambrel comprising a pair of pivotally connected hook arms, and a pair of brace arms pivotally attached at their outer ends to the lower ends of the hook arms and provided at their inner ends with perforated lugs adapted to register, one of said arms being provided with a reduced portion and a transverse shoulder and the meeting end of the other brace arm being provided with a longitudinally disposed lip extending into the reduced portion of the first-mentioned brace arm and adapted to engage the transverse shoulder thereon.

3. A gambrel comprising a pair of hook arms pivotally connected at their upper ends and provided at their lower ends with upstanding hooks and on their under sides with perforated lugs below the planes of the said hooks, and brace arms pivotally connected at their inner ends and having forked outer ends pivotally attached to the said lugs.

4. A gambrel comprising a pair of hook arms pivotally connected at their upper ends and provided at their lower ends with upstanding hooks and on their under sides with perforated lugs below the planes of the said hooks, and brace arms having their outer ends pivoted to the said lugs and their inner ends pivoted together, one of said arms being provided at its inner pivoted end with a reduced portion and a transverse shoulder and the other arm being provided at its inner pivoted end with a longitudinally disposed lip extending into said reduced portion and adapted to engage said transverse shoulder.

In testimony, that I claim the foregoing as my own, I have hereto affixed my signature in the presence of two witnesses.

RAYMOND G. SHELLER.

Witnesses:
E. G. EMMINGER,
MINERVA BLOUGH.